Sept. 4, 1951 W. R. McKAY 2,566,991
ADJUSTABLE BEARING FOR DISK HARROWS AND THE LIKE
Filed Feb. 18, 1950
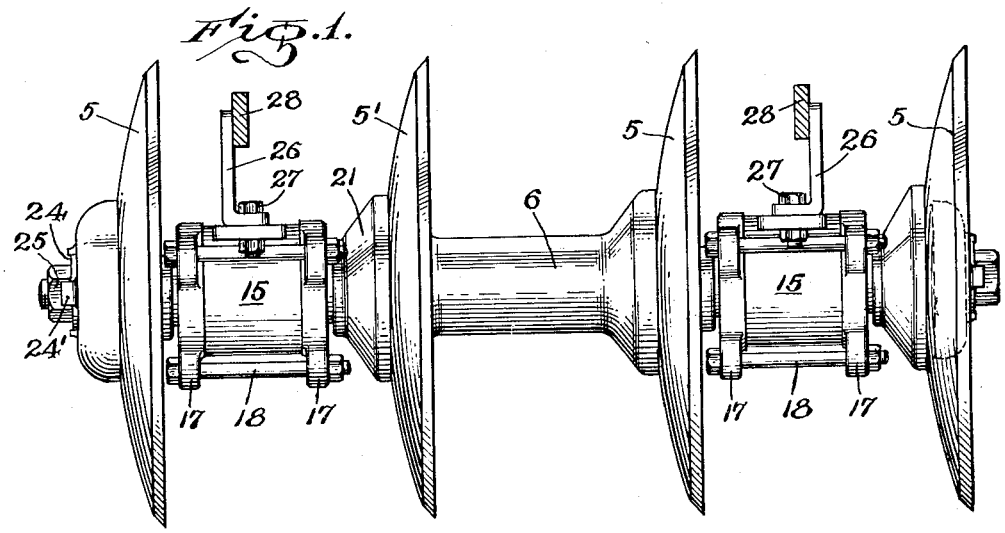
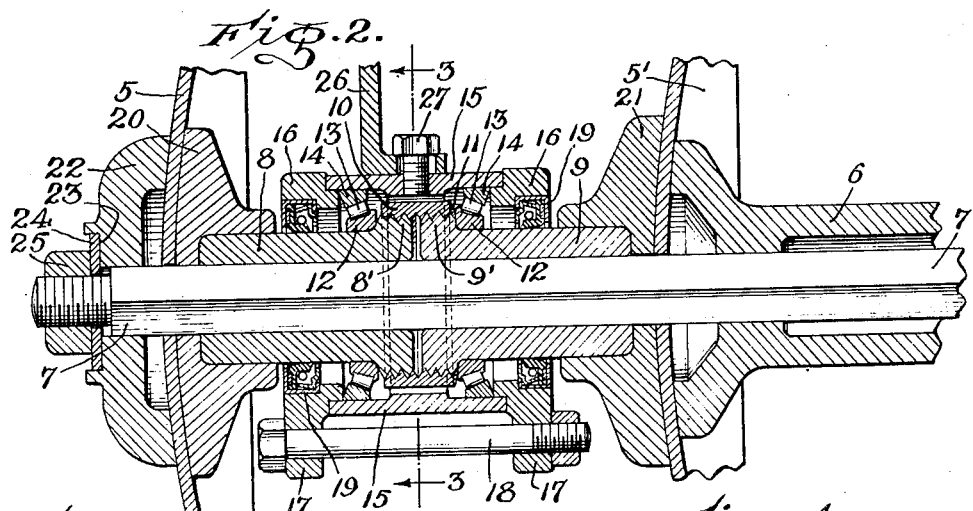
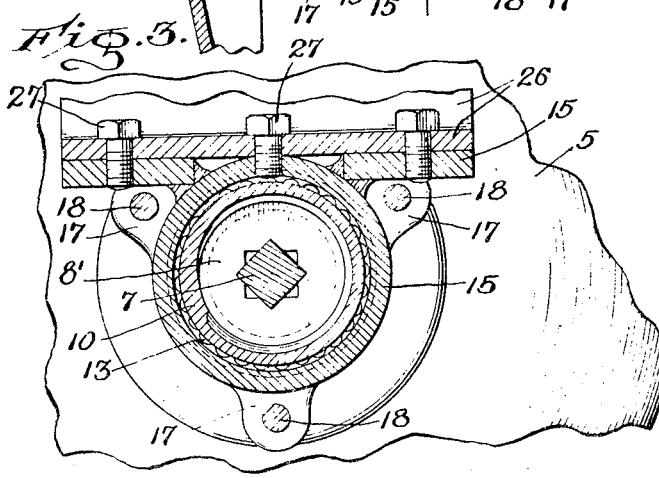
Inventor
William R. McKay,
BY
Attorney Patented Sept. 4, 1951

2,566,991

UNITED STATES PATENT OFFICE 2,566,991

ADJUSTABLE BEARING FOR DISK HARROWS AND THE LIKE

William R. McKay, South Gate, Calif.

Application February 18, 1950, Serial No. 145,006

6 Claims. (Cl. 308—181)

This invention relates to adjustable bearings for disk harrows, and the like, and more particularly to an adjustable bearing which can be adjusted to tighten or to loosen, with a minimum amount of effort, and without disturbing the assembly or the lubrication therein. The invention is particularly designed to be placed between the end disk of a harrow and the disk next adjacent, on the carrying shaft or axle.

One of the principal objects of the invention is to provide in combination with a gang of disks, a square, or angular shaft, in cross section, with an adjusting bushing thereon, said adjusting bushing having a bore therethrough of double square form in cross section, one square being turned an eighth turn relative to the other, through said bearing, whereby said bore is in the form of an eight point star in cross section, thus making it possible for a square shaft therein to be withdrawn and reinserted after being turned an eighth turn in either direction, in a manner and for a purpose to be described and illustrated in the accompanying drawings.

In the drawings: Figure 1 is a side view of a gang of four disks in assembled condition;

Figure 2 is an enlarged sectional view, taken through the two end disks, showing the bearing assembly;

Figure 3 is a fragmentary cross sectional view, taken on the line 3—3 of Fig. 2; and Figure 4 is a perspective view of one of the adjustable bearing bushings removed.

Referring to the drawings more in detail, the disks are designated 5 and 5', with a special spool, as 6, between disks where no supporting bearing is used.

The carrying shaft, designated 7, is square, and is provided with two bearing bushings, as 8 and 9, having enlarged ends, as 8' and 9', threaded to receive a coupling collar 10, internally threaded, as indicated, and into which the adjacent, threaded ends of said bushings are screwed, as will be understood from Fig. 2. Bushing 9, after being screwed into place, is welded to the edge of said collar 10, as at 11, to hold it in fixed relationship to said collar.

The other bushing can be screwed into or out of said collar 10, by simply turning it in one direction or the other, as desired.

In the angle of each bushing, is placed a bearing collar, as 12, and on each of which is a roller bearing cage, designated 13, with an outer bearing collar 14, all positioned within an outer sleeve or cylindrical housing 15.

Inserted into the opposite ends of this housing member 15, are two end rings or members, as 16, having spaced ear portions, as 17, for connecting them and drawing said end members 16, 16 together by means of bolts, as 18, 18, one of which is shown in Fig. 2, but all three of which are shown in Fig. 3. Said end rings or members have in their outer sides annular seats in which are placed sealing rings, designated 19, and which can be of standard make, thus sealing the bearing assembly within the housing member 15, around the two bushings 8 and 9, as clearly indicated in Fig. 2.

Lubricant is filled into said bearing assembly and is retained therein by said sealing rings 19, 19.

The outer ends of said bushings 8 and 9, are provided with cap-like bearing or clamping members, as 20 and 21, the member 20 having a convexed face to bear against the inner concaved face of the disk 5, and the member 21 having a concaved face to bear against the outer convexed face of the disk 5', as clearly indicated in Fig. 2.

On the outer end of the square shaft, against disk 5 is an outer bearing member, or washer 22, having a socket 23 in its outer face to receive a lock washer 24 therein, said lock washer having a wing portion, as 24', to bear on a nut 25, on the outer threaded end of said square shaft, as seen in Fig. 1.

As a means for supporting or connecting said gang of disks with a carrying frame, bracket members, as 26, 26, are shown bolted to the housing 15, by means of bolts 27, 27, with its upper end secured by welding, or otherwise, to frame members 28, 28.

Thus I have provided an adjustable bearing which is lubricant tight, and which can be tightened or loosened without interference with the bearing assembly, or with the lubricant within said bearing.

Assuming that the bearing is a little loose and it is desired to tighten it, it is only necessary to remove the nut 25 on the end of the square shaft 7, pull said shaft inwardly through the bushing 8, with the end of said shaft within the other bushing 9, insert a square tool into bushing 8 from the outer end and give it an eighth turn to tighten, and then replace the main shaft 7 and its nut 25, and the job is done. This is accomplished by the fact that the enlarged threaded head 8' of said bushing 8 screws into the coupling collar 10, as before described, and as shown in the sectional view, Fig. 2. This adjustment does not interfere with the bearing assembly, or the lubricant within the bearing housing and sealed therein by the sealing rings 19, 19.

The nature of the bore through the bearing bushing 8, as seen in Fig. 4, makes a unique method and means for tightening and loosening the bearing by giving it an eighth turn to correspond with the relative positions of the angles or corners in said bore, and to make this adjustment without opening up said bearing member housing or interfering with the assembly or the lubricant therein. The bearing is dust proof and all dirt, sand and other foreign matter is kept out of the bearing, as will be understood from the showing.

I know that changes in the details of construction and arrangement here shown can be made within the scope of the invention, and I do not, therefore, limit the invention to these details, except as I may be limited by a reasonable construction of the hereto appended claims forming a part of this specification.

I claim:

1. An adjustable bearing of the character referred to, including a pair of bearing bushings having their adjacent ends threaded, a collar into the opposite sides of which the threaded ends of said bushings are screwed, whereby one of the bushings can be adjusted axially by turning into or out of said collar, a cylindrical housing around said collar and bushings, anti-friction bearing means between said bushings and said housing, means for retaining lubricant in said housing for said bearing means, said bushings having a bore therethrough of angular form in cross section, a shaft through said bushings and movable longitudinally therein, one of said bushings being rotatable a partial turn relative to the other when said shaft is withdrawn therefrom into said other bushing, whereby said first bushing is adjusted axially by said partial turn, and said shaft is returned to its normal place.

2. An adjustable bearing of the character referred to, including a pair of bearing bushings having their adjacent ends enlarged and threaded to receive a coupling collar, a coupling collar into the opposite ends of which said bushings are screwed, whereby one of said bushings can be adjusted axially by turning into or out of said collar, a cylindrical housing around said collar and said bushings, anti-friction bearings between said bushings and the inside of said housing, closure ring members in the opposite ends of said housing, sealing rings in said closure rings to retain lubricant within said housing for said bearings, said bushings having a bore therethrough lengthwise thereof, said bore in cross section being in the form of a star with spaced angles around the axis thereof, a shaft fitting through said bushings and being angular in cross section to fit into said angles, whereby one of said bushings can be turned when said shaft is withdrawn therefrom into the other bushing to adjust said bushing bearing axially, said shaft being reinsertable into said adjusted bearing bushing to fit other angles of said bore in the manner described.

3. In combination between two spaced members having a shaft axially therethrough, an adjustable bearing consisting of two bearing bushings having their adjacent ends enlarged and externally threaded, a coupling collar into the opposite ends of which said bushings are screwed, whereby one of said bushings can be adjusted axially by turning into or out of said collar, a housing enclosing said collar and the threaded ends of said bushings, anti-friction bearing means interposed between said bushings and said housing, sealing means in the opposite ends of said housing for retaining lubricant therein for said bearing means, said bearing bushings having a bore therethrough lengthwise thereof, said bore having angles formed therein in cross section, a square shaft through said bearing bushings and said two spaced members, the corners of said shaft fitting the angles of said bore, whereby either of said bearing bushings can be rotated a partial turn in said coupling collar to position the corners of said shaft in other angles of said bore, said shaft being withdrawable from one of said bushings into the other to permit said partial rotation.

4. In an adjustable bearing forming a spacer between numbers, a pair of bearing bushings having their adjacent ends enlarged and externally threaded, a coupling collar into the opposite ends of which said bushings are screwed, whereby one of the bushings can be adjusted axially by turning into or out of said collar, a housing around said coupling collar, closure end members in the opposite ends of said housing with sealing rings in said closure end members for retaining lubricant in said housing, anti-friction bearings between said bushings and said housing, said bushings having longitudinal bores therethrough of star form in cross section to provide angles spaced around said bore, a shaft of corresponding angle form in cross section through said bushings and through said spaced members, said shaft being withdrawable from one bushing into the other to permit partial rotation of said one bushing for adjustment, said shaft being reinsertable in said one bushing after the adjustment thereof in said coupling collar.

5. In combination with the disks of a disk harrow, an adjustable bearing between two of said disks and consisting of two bearing bushings having their adjacent ends externally threaded, a coupling collar into the opposite ends of which said bushings are screwed for axial adjustment therein, one of said bushings being secured to said collar to prevent relative turning, a housing around said coupling collar, having means in its opposite ends for retaining lubricant therein, anti-friction bearing means interposed between said bushings and said housing in said lubricant, said bushings having bores therethrough longitudinally thereof, said bores having angles formed therein in cross section, a square shaft through said bushings and having its corners fitting into the angles of said bores to prevent turning, said shaft being withdrawable from the unsecured bushing into the secured bushing, whereby the unsecured bushing can be rotated a partial turn for adjustment, and said shaft reinserted therein after adjustment.

6. An adjustable bearing mechanism having axial adjustment between spaced members at the opposite ends thereof, including two bearing bushings having their adjacent ends enlarged and externally threaded and their opposite ends connected with said spaced members, a coupling collar internally threaded and into the opposite ends of which the threaded ends of said bushings are screwed for adjustment axially, a housing around said collar, anti-friction means between said bushings and said housing, closure members in the opposite ends of said housing, sealing rings in said closure members to retain lubricant therein, means for clamping said closure members together in the ends of said housing, said bushings having bores therethrough lengthwise, said bores being star form in cross section, a square shaft through said spaced members and through said bearing bushings, said shaft being withdrawable from one of said bushings into the other to permit partial rotation of said first bushing for adjustment purposes, whereby said shaft can be reinserted through said first bushing after said adjustment.

WILLIAM R. McKAY.

REFERENCES CITED

The following references are of record in the file of this patent:

UNITED STATES PATENTS

| Number  | Name    | Date          |
|---------|---------|---------------|
| 691,922 | Whitely | Jan. 28, 1902 |

FOREIGN PATENTS

| Number | Country | Date         |
|--------|---------|--------------|
| 5,251  | France  | Dec. 2, 1905 |